Patented June 10, 1924.

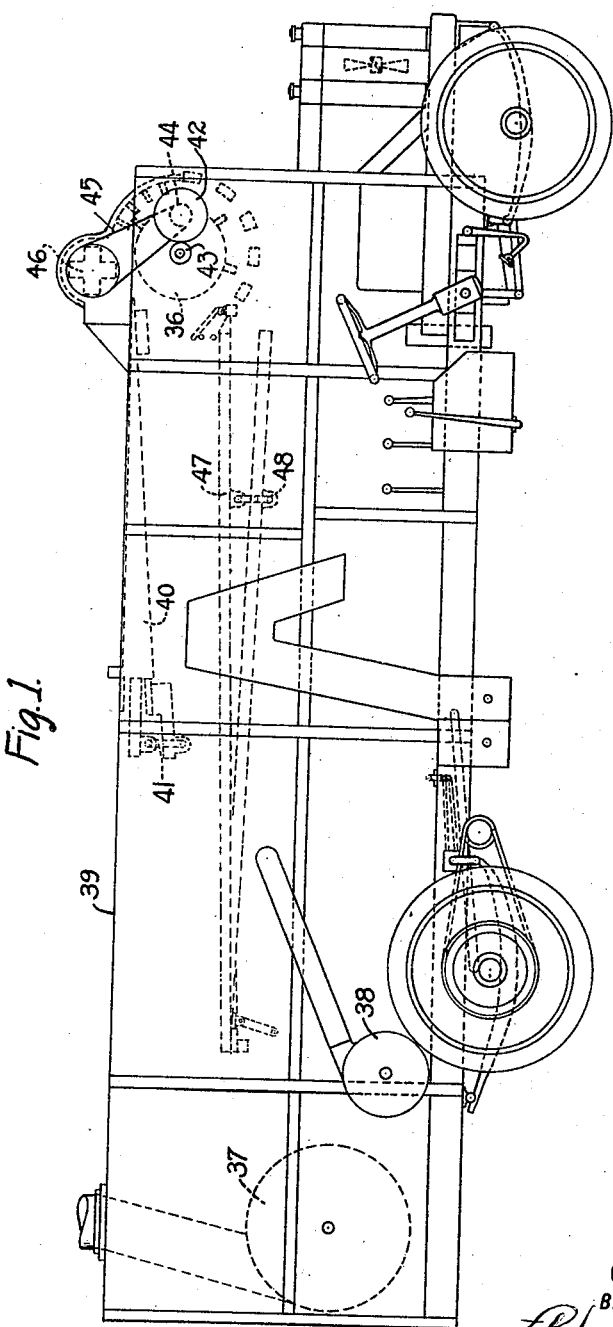

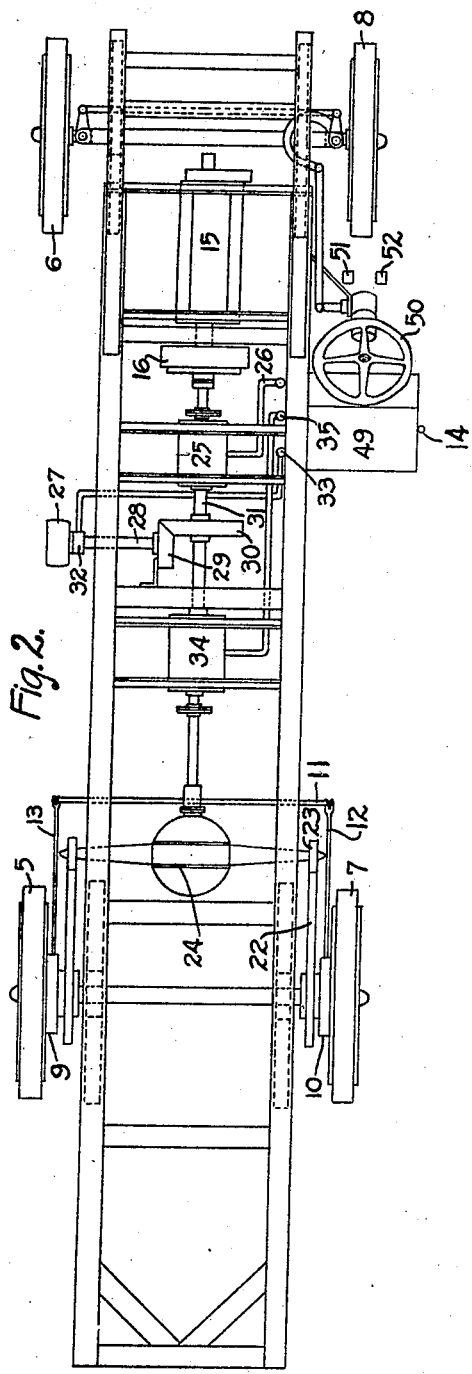
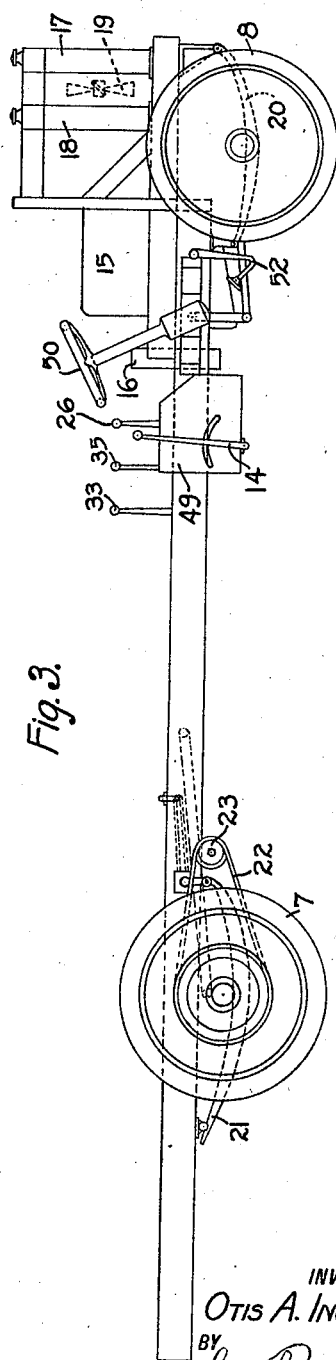

1,496,882

UNITED STATES PATENT OFFICE.

OTIS A. INGERSOLL, OF MARTINSBURG, NEW YORK.

THRASHING MACHINE.

Application filed August 25, 1921. Serial No. 495,377.

*To all whom it may concern:*

Be it known that I, OTIS AARON INGERSOLL, a citizen of the United States, and resident of the town of Martinsburg, county of Lewis, State of New York, have invented certain new and useful Improvements in Thrashing Machines.

The device which is the subject of this invention is a self-propelled thrashing machine having a power plant which may be employed not only for moving the machine from place to place but also for operating the machine when it is located at its place of operation and this power plant is so designed that it may be operated continuously without the necessity of an interval of rest between the time when it is utilized as a traction element and the time when it is utilized with the thrashing elements.

Another particular advantage of this invention is found in the construction and arrangement of parts making possible a more efficient thrashing means and also making it possible to feed the thrashing means from a point interior of the end thereof.

Another important improvement is the provision of an operating platform as a part of the machine and from which the feeding can be accomplished and another and important advantage of the invention is the construction and arrangement of the power transmission means which increases the number of available speeds for traction purposes making it possible to decrease or increase the traction speed and torque to a very great extent.

Other and important advantages will be described as the specification advances.

The following is what I consider the preferable means for carrying out this invention and the accompanying drawings should be considered for a complete understanding of the specification which follows:

In the drawings:—

Fig. 1 is a side elevation of my device.

Fig. 2 a plan view of the chassis.

Fig. 3 a side elevation of the chassis alone.

Similar reference numerals indicate like parts in all the figures where they appear.

As certain parts to be later referred to are of construction well understood and as the construction and function of these parts need not be changed to allow them to operate efficiently with my device I will in many instances refer to such parts by reference character only omitting the detailed description and the method of operation it being understood that such parts function in their ordinary manner notable among such parts referred to briefly are the supporting or traction wheels 5, 6, 7 and 8, the wheels 5 and 7 being the driving wheels and the wheels 6 and 8 the front or steering wheels. The brake bands 9 and 10, the brake bar 11, brake rods 12 and 13 and brake lever 14 require no particular description nor does the ordinary gasoline engine 15 and clutch mechanism 16 which may be selected from any of the well-known devices on the market care being only necessary to select the device most suitable for the work to be accomplished.

I have found that the single radiator employed with an automobile or motor truck is not sufficient to radiate the heat from an engine subject to continuous service regardless of the speed at which the engine should be operated. I have therefore provided two radiators 17 and 18 arranging the fan 19 between the radiators. These radiators may be located wherever desired but I prefer that they be in the general position shown at the front end of the chassis.

I also prefer that springs 20 and 21 be provided and that the driving wheels be connected by means of chains 22 to sprockets 23 upon the driving shaft and I may provide a differential mechanism 24 in the driving shaft.

Adjacent the clutch 16 is a transmission 25 controlled by a lever 26. This transmission may be employed for controlling the speed of rotation of the pulley 27 upon a shaft 28 operated by the gear 29 from the main gear 30 on the longitudinal shaft 31 and I may provide a clutch 32 for disconnecting the pulley 27. This clutch being operated by means of a lever 33.

I provide a second transmission 34 in the longitudinal shaft and controlled by a lever 35 both of the transmissions 25 and 34 may be utilized in controlling the speed of the driving wheels 5 and 7 providing a great variety of possible speeds of the driving wheels, the number of different speeds being nine if ordinary transmissions be employed.

From the pulley 27 a single belt may be employed to rotate the thrashing drum 36 and the blowers 37 and 38 as well as the feeding and transferring mechanism to be later referred to.

The thrashing machine proper consists of an oblong cabinet, one-half of the top of which is closed by a platform 39 which is the operating platform where the attendant will stand while supervising the feeding and which may also be used as a load platform for receiving the grain or other substance to be passed through the thrasher. Part of the forward portion of the top is open and in this open portion I arrange a straw moving device 40 consisting of a plurality of arms reciprocated by the crank shaft 41. These arms move the straw toward the front of the machine and toward the thrashing drum 36 there arranged.

A friction gear 42 operating from a friction pinion 43 upon the shaft of the thrashing drum rotates a sprocket 44 which drives a chain 45 passing over a larger sprocket 46 on the shaft of a feed controlling device. The feed controlling device will serve to retain the grain and particularly bundles of grain and prevent the entire bundle from passing into the machine thereby obviating the possibility of choking or clogging the thrashing drum.

Means are also provided for removing the straw from the thrashing drum consisting of the bars 47 operated by means of a crank shaft 48 and arranged to move the straw in the direction opposite to the movement induced or produced by the bars 40. It is obvious that I provide grain separating and straw removing means and other parts or devices necessary to produce an efficient thrashing machine, all of which are shown and described in an application for Letters Patent filed Aug. 25th, 1921, Serial #495,378.

As shown in Fig. 2 the operator's seat 49, steering wheel 50 and clutch and service brake pedals 51 and 52 are arranged exterior to the chassis. The relative size and arrangement of parts may be changed at will and modifications may be made within the scope of the appended claims without departing from the principle or sacrificing the advantages of this invention.

Having carefully and fully described my invention what I claim and desire to secure by Letters Patent is:

1. A thrashing machine comprising an oblong cabinet an operating platform upon the top of said flat topped cabinet and a thrashing mechanism at one extreme end of said cabinet and having its entrance passage upon the plane of the top of the cabinet.

2. A thrashing machine comprising an oblong flat topped cabinet, a feed control and thrashing means adjacent to the top and at one extreme end of said cabinet, feeding means arranged upon the level of the top of said cabinet and adjacent to said thrashing means and an operating platform upon said cabinet and adjacent to and upon the same plane as said feeding means.

Signed at Martinsburg, county of Lewis, State of New York, this 22 day of August, 1921.

OTIS A. INGERSOLL.